E. R. LINEBAUGH.
FEED GAUGE FOR PRINTING PRESSES.
APPLICATION FILED APR. 4, 1921.
1,430,911.
Patented Oct. 3, 1922.
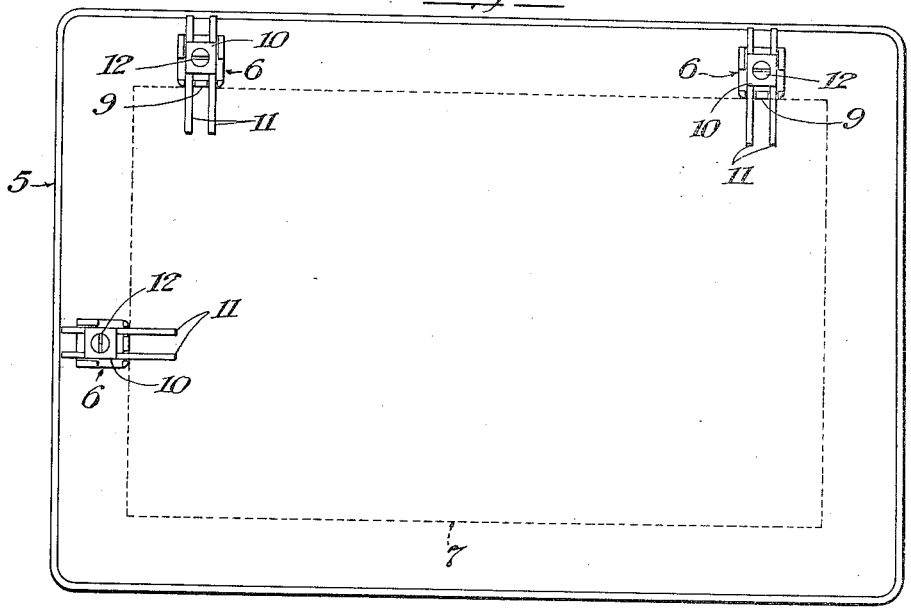
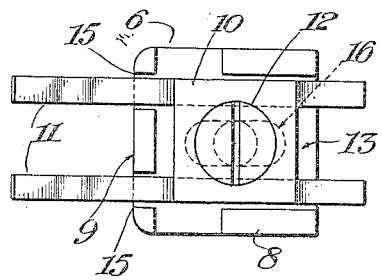
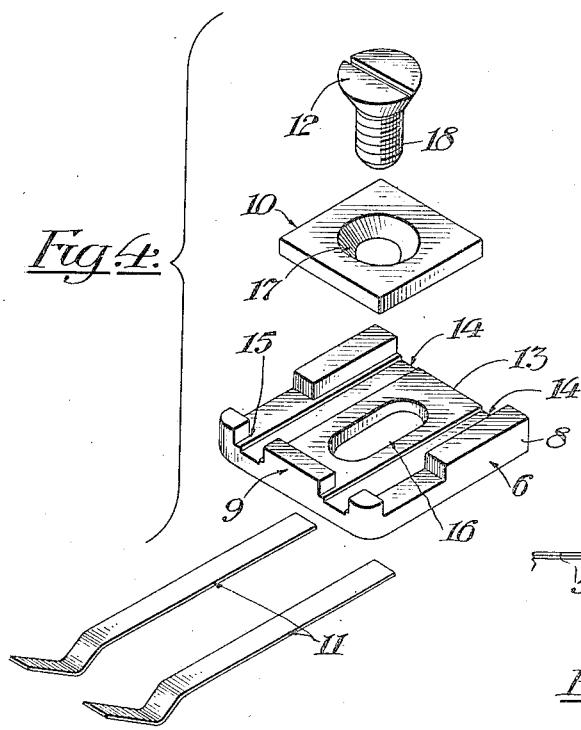
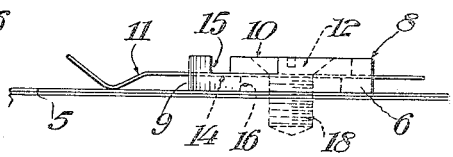
Inventor,
Edward R. Linebaugh
by his Attorney
John R. Nolan Patented Oct. 3, 1922.

1,430,911

UNITED STATES PATENT OFFICE.

EDWARD R. LINEBAUGH, OF BARBERTON, OHIO, ASSIGNOR TO THE DIAMOND MATCH COMPANY, OF CHICAGO, ILLINOIS, A CORPORATION OF ILLINOIS.

FEED GAUGE FOR PRINTING PRESSES.

Application filed April 4, 1921. Serial No. 458,262.

*To all whom it may concern:*

Be it known that I, EDWARD R. LINEBAUGH, a citizen of the United States, and resident of Barberton, in the county of Summit and State of Ohio, have invented certain new and useful Improvements in Feed-Gauges for Printing Presses, of which the following is a specification.

This invention relates to feed-gauges for printing presses; and it has for its object to provide a device of simple, inexpensive and effective construction which can be readily mounted on the platen at a predetermined location, and which device includes a gauge head that can be adjusted with facility to, and secured in various positions within limits, to meet particular requirements of service.

According to my invention the feed-gauge comprises a base plate having a gauge head at one end thereof; a cap plate imposed on the base plate; a stripper finger or fingers extending between the two plates, and a single screw passing through orifices in the plates and into the platen in such a manner as to clamp the parts of the device together and to the platen, the orifice in the base-plate being elongated to permit independent adjustment of the latter with its gauge head and stripper finger or fingers in relation to the cap plate.

The invention also comprises details of construction which will be hereinafter described and claimed.

In the drawings—

Figure 1 is a plan of a platen equipped with gauge-devices embodying my invention.

Fig. 2 is a plan, enlarged, of one of the gauge devices, detached.

Fig. 3 is a side elevation of the device.

Fig. 4 is a perspective view of the separate parts of the device.

Referring to the drawings, 5 designates the platen of a printing press, and 6 my improved feed-gauge. In Fig. 1 three of the gauges are illustrated as located at different positions on the platen, so as to serve as side and end guides respectively for the sheet, 7, to be printed. Each gauge comprises a rectangular base plate 8 having a gauge head 9; a cap plate 10 superposed on the base plate; one or more spring stripper fingers 11 extending forwardly beyond the gauge-head and rearwardly between the plates, and a single screw 12 which serves not only to secure the gauge to the platen but also to clamp the plates and fingers together in such a manner as to permit longitudinal adjustment of the base plate and the stripper finger or fingers in respect to the relatively fixed cap plate.

The upper surface of the base plate is recessed to provide a longitudinal channel 13 which is flush with the rear end of the plate, but terminates short of the front end of the plate to present the gauge head 9. The floor of the channel has formed therein spaced parallel grooves 14 which extend from end to end of the base plate thus intersecting the gauge head, as at 15. The floor of the channel is also provided intermediate the grooves with an elongated opening 16. The channel 13 slidably receives the rectangular cap-plate 10, which latter is provided with an orifice 17 through which and the elongated opening of the underlying base-plate passes a screw 18, the free end of which is adapted to be entered into a tapped socket in the platen and thus couple the two plates together and also secure the device as a whole to the platen.

The tangs of the stripper fingers 11 extend through the grooves 14 of the base plate, and are thus held in place by the cap plate when the parts are assembled and secured to the platen.

By the construction above described it will be seen that by properly turning the head of the single screw 18 and thus relieving the clamping action of the cap-plate, the base plate, together with the stripper fingers can be manually moved longitudinally of the cap plate and the gauge-head and the associated fingers thus adjusted to any predetermined position within the limits of the opening 16, and then by tightening the screw the base plate and the fingers can be effectually clamped in place.

I claim—

1. In a feed-gauge for printing press platens, a base plate having an elongated screw-hole therein and having also a gauge head at one end, a cap-plate imposed on the base plate and having a screw hole in registry with that of the base plate, a stripper finger or fingers seated between the two plates, and a single clamp screw extending through the holes of the two plates, the head of the screw bearing on the cap-plate and the shank being screwed into the platen of the press, whereby the base plate and the stripper finger or fingers are adjustably secured together and to the platen.

2. In a feed-gauge for printing press platens, a base plate having in its upper surface a longitudinal channel which is flush with the rear end of the plate but terminates short of the front end of the plate, the floor of said channel having spaced parallel grooves extending from end to end of the plate and having also an elongated hole between and longitudinally of said channel and having a screw hole in registry with the elongated hole of the base plate, stripper fingers seated in the grooves of the baseplate, and a clamp screw extending through the holes of the two plates and screwed into the platen of the press.

Signed at Barberton, in the county of Summit and State of Ohio, this 30 day of March, A. D. 1921.

EDWARD R. LINEBAUGH.